Oct. 20, 1970  B. D. RAFFEL ETAL  3,535,151
PREPARATION AND SPRAY APPLICATION OF A RAPID
THICKENING RESIN SYSTEM
Filed Aug. 2, 1967

INVENTORS
BERNARD D. RAFFEL
RAYMOND W. SHEATSLEY

BY:
Oldham & Oldham
ATTORNEYS 3,535,151
PREPARATION AND SPRAY APPLICATION OF A RAPID THICKENING RESIN SYSTEM
Bernard D. Raffel, Akron, and Raymond W. Sheatsley, North Canton, Ohio, assignors to Goodyear Aerospace Corporation, Akron, Ohio, a corporation of Delaware
Filed Aug. 2, 1967, Ser. No. 657,977
Int. Cl. B05b 7/04
U.S. Cl. 117—105.5                                   4 Claims

ABSTRACT OF THE DISCLOSURE

This invention relates to a method for providing a rapid thickening resin system whereby a dry resin sensitive to moisture is sprayed with moisture selectively added to the resin during spraying whereby the amount of moisture added controls the thickening of the resin system which is sprayed. The same technique is applicable for making prepregs by methods other than spraying.

---

Figure 1:
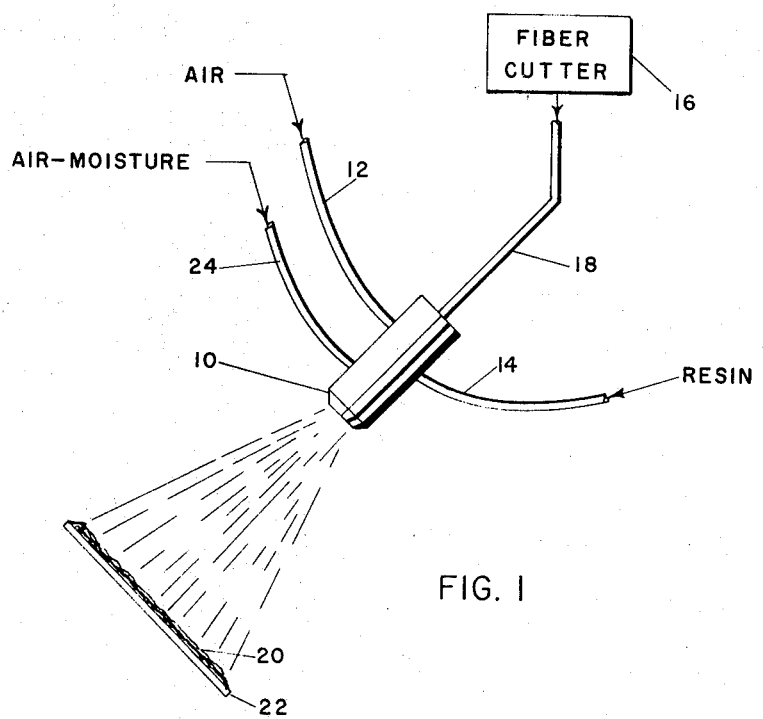

Heretofore, it has been well known to spray resin of the polyester type from nozzles to provide a reinforced plastic system which may be cured either by heat or at room temperature, and further where short lengths of fiber glass strands are added to the sprayed mixture to increase the final strength of the system. For example, U.S. Pat. No. 3,073,534 shows a suitable nozzle for spraying resin, while Pat. No. 3,118,336 shows a fiber cutter which can be used to deposit small lengths of cut fiber into the sprayed resin from the nozzle. All prior methods of forming this type of resin system have carefully avoided any use of moisture as water has been harmful to the final properties of the system. However, when using a chemically thickened system, it has been found that the thickening time for a sprayed polyester resin and cut fiber reinforcement varies anywhere from one to several days or weeks before desired molding can take place due to the variation of moisture. At present all attempts to provide effective control towards the thickening or set-up time of the system have been unsatisfactory.

In the molding of glass fiber reinforced polyester resins wherein the material flows to fill the die cavity, during the flow of material as the dies are closed, it is important that the resin and fibers flow in such manner that:

(1) Resin does not separate from the fibers, resulting in resin-rich and glass-poor areas;

(2) The fibers do not become preferentially oriented with the direction of flow, resulting in anisotropic properties;

(3) The fibers do not buckle and bend as they flow to the edge of the part, producing surface waviness.

It has been found that the desirable flow characteristics can be achieved by increasing the viscosity of the polyester resin to something around 10 or 20 million centipoises (at room temperature). At lower viscosites, the undesirable phenomena mentioned above are encountered, although various techniques can be used to minimize their importance. At the higher viscosities, as the resin flows, it carries fibers along with it in generally random manner without preferential orientation and without separation. Also bending and buckling of fibers at the edge of the part are minimized, if not eliminated.

However, it is not feasible to impregnate fibers with resins of viscosity much greater than, say, 8000 c.p.s. The solution is to impregnate in a low viscosity stage, and then advance the viscosity. To do this with polyesters has not been practical prior to the recent introduction of the inorganic metallic thickening compounds such as magnesium oxide and magnesium hydroxide.

Other advantages have accrued to thickening. These are:

(1) Greater ease of handling the molding stock because of non-tacky condition;

(2) Improvement in surface smoothness due to better fiber submergence, and the higher pressure molding accompanying the higher viscosity.

Therefore, the general object of the invention is to provide a process which can selectively control and effectively increase the thickening time of a sprayed polyester resin having short lengths of cut fiber therein. This control is achieved by using moisture sensitive thickening agents to the resin before spraying, and then adding less than about 1% water to the system as it is sprayed.

Figure 2:
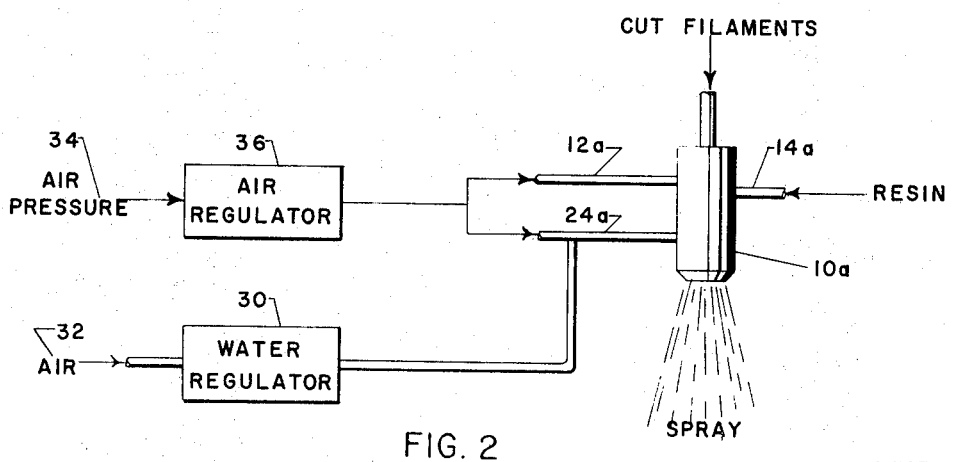

For a better understanding of the invention, reference should be had to the accompanying drawings in which:

FIG. 1 illustrates a typical spray system to achieve the method of the invention; and FIG. 2 is a schematic illustration of a typical system to provide a desired moisture content to the mixture when sprayed.

With reference to FIG. 1 of the drawings, the numeral 10 indicates generally a resin spray nozzle which might be of the type illustrated in U.S. Pat. No. 3,073,537, and which essentially utilizes an air line 12 as an input to provide pressure for spraying resin supplied thereto over line 14. In order to add fiber or cut filaments to the sprayed resin system, a fiber cutter 16 is provided to feed through a tube 18 into the nozzle 10. The sprayed resin builds up as a system 20 onto a receiving surface 22, and can either be cured or formed to the surface upon which it is sprayed, or built up to large proportions in sprayed layers and then molded to a desired configuration. Other techniques besides spraying might be used to form the resin system, also, and utilize the method of the invention described hereinafter.

The objects of the invention, however, are achieved by utilizing a resin system which is substantially completely dry, that is with a minimum amount of moisture definitely less than 0.2% but sensitive to moisture for the rate of reaction towards thickening. The invention particularly contemplates the use of a polyester resin with an appropriate thickener such as $MgO$, $Mg(OH)_2$, or $Ca(OH)_2$, which are sensitive to moisture in the system for their rate of reaction. Moisture normally in the form of water or $H_2O$ may be added to the nozzle 10 through a line 24, either in liquid form or at nearly 100% saturated gaseous form so that in the spraying process, the moisture is incorporated into the resin system 20 deposited on surface 22. The resin which is in the tanks, and passes through suitable plumbing to the line 14 can thus be kept dry, and so thickening can be controlled to almost any desired amount so that, for example, the sprayed resin system can be set to thicken so that it can be properly molded in one day or less by adding a predetermined amount of water or moisture saturated air.

Steam would be one method of adding air at nearly 100% moisture saturation in line 24, although a direct water or moisture connection to nozzle 10 might be separately added. Also, it would be possible to simply control the humidity in the air line 12 so that it would be nearly at a relative humidity necessary to add the proper amount of water to the sprayed mixture.

A typical apparatus which might be utilized to selectively add moisture to the system is shown in FIG. 2. Specifically, a moisture regulator 30 is provided and driven by an air pressure source over line 32. The regulator 30 may be one made by Finn and Fram, Los Angeles, Calif., and is easily adjustable to inject as the last step any selected amount of water into the air delivered to air line **24*a* feeding into nozzle 10*a*. Normally the air will be provided from a suitable pressure source 34**, and is controlled in pressure by regulator 36, dependent on the needs of the system.

A high degree of control on the percentage of moisture added is quite important when spraying resins having critical demands so that a precise amount of moisture is added in the last stage. In testing the apparatus and method of the invention it was found that on critical resins of this type, if the moisture were added to the resin in the tanks before spraying, that the resin would tend to start setting up in the tanks. And even so, with spraying begun immediately to avoid the setting up in the tanks, under conditions of very low humidity the final sprayed composite would not set up at all because so much moisture had been lost during the spraying. Thus, the need for practicing the method of the invention is almost absolutely necessary when spraying resins critical in their setup upon the amount of moisture present therein.

It has been found that the addition of between about 1% to 15% of the thickening agent to the resin can then selectively control thickening with the addition of less than 1% water. In other words, the combination described will thicken the resin normally having a viscosity of between about 2,000 to 10,000 centipoise to a viscosity of between about 2 to 30 million centipoise within as short a time as about 1 to 5 hours, but preferably so as to be properly thickened in within 24 hours for proper molding characteristics.

Thus, it is seen that the objects of the invention are achieved by maintaining of low viscosity mix or resin in the tanks to be sprayed to provide a long working life thereof, yet selectively controlling the curing or thickening rate of the resin system sprayed by incorporating moisture sensitive components in the resin, and selectively adding moisture to the resin system as it is sprayed.

The magnesium oxide or hydroxide compounds used to cause thickening require moisture to function and a rather precise amount for the proper thickening rate. If less than about 0.1–0.2% of moisture, hardly any thickening occurs; if more than about .5 to .6% of moisture, thickening can occur in a fraction of an hour or even minutes so that there is insufficient time to process through the equipment.

It has been found that the amount of water present in the resin system is dependent upon atmospheric humidity. The resin system can gain or lose moisture depending upon the relation of moisture in the system to moisture in the surrounding atmosphere. The amounts of water needed to be added to the mix will vary with humidity and with water introduced from other sources. For example, water is introduced:

(a) From absorbed moisture on fillers added to the resin, especially clays;

(b) Water is absorbed (or lost) during mixing of the resin with its various compounding ingredients;

(c) Water is absorbed (or lost) from atomizing air and induction air in the spray nozzle;

(d) Water is absorbed (or lost) as sprayed material is exposed to ambient air; and (e) Water may be present in the resin from absorption during storage, or residual from the original manufacturing process.

(f) From moisture on the glass fibers.

To effect the correct amount of moisture in the final resin system after spraying by addition of liquid water to the resin during mixing, requires that the amount of water introduced from the sources above-outlined be known.

The only way that has been found to control the total amount of final moisture under all conditions in the product so that thickening occurs in 24 hours or less after spraying, yet does not occur so rapidly that the sprayed material cannot be processed, is to add the moisture at the last stage, which is spraying.

By this invention, one can provide for the addition of moisture at the spray head alone, and in sufficient amounts to compensate for all losses during processing. As one method to pin-point the exact amount that should be added at the spray head, resin can be processed through the system, and after spraying, a sample collected and analyzed for water content by one of the rapid automatic moisture analyzers such as the Beckman Aquameter as made by Beckman Instruments Company. The water injector 30 can then be adjusted until the correct amount in the sprayed resin is obtained. Other suitable methods to determine the proper amount of moisture to be added may also be utilized.

While in accordance with the patent statutes, only one structure for achieving the method of the invention is illustrated and described; it is to be understood, however, that there might be many other structures to achieve the method of the invention, and that the scope of the method to be covered is set forth in the appended claims.

What is claimed is:

1. A method for providing a rapid thickening resin system which includes the steps of spraying a substantially dry liquid polyester resin mixed with a moisture sensitive thickener from a class including MgO, $Mg(OH)_2$ and $Ca(OH)_2$ onto a surface to form a system, while selectively adding moisture to the mixed resin and thickener as it is sprayed whereby the amount of moisture added will control the thickening of the resin system.

2. A method according to claim 1 where the moisture added is water and where it is added in the form of small water droplets interspersed with air in the spraying technique.

3. A method according to claim 1 where the moisture added is water, and where it is added by utilizing air to achieve the spraying and wherein the humidity level of the air used for spraying is controlled depending on the amount of moisture necessary to be added to the resin.

4. A method according to claim 1 where reinforcing fibers are selectively added to the resin as it is sprayed.

References Cited

UNITED STATES PATENTS

| | | | |
|---|---|---|---|
| 2,641,586 | 6/1953 | Nordlander et al. | |
| 3,110,690 | 11/1963 | Friedsam. | |
| 3,124,553 | 3/1964 | Cordts | 260—37 X |
| 3,240,736 | 3/1966 | Beckwith | 260—37 X |
| 3,324,663 | 6/1967 | McLean | 260—40 X |
| 3,373,129 | 3/1968 | Kori et al. | 260—40 X |
| 3,440,086 | 4/1969 | Kerns | 117—105.5 |
| 3,049,439 | 8/1962 | Coffman | 239—428 X |
| 3,050,262 | 8/1962 | Curtis | 239—428 X |
| 3,214,103 | 10/1965 | Kempthorne | 239—428 X |

ALFRED L. LEAVITT, Primary Examiner

J. H. NEWSOME, Assistant Examiner

U.S. Cl. X.R.

117—161; 118—300, 600; 239—428